US012256477B2

(12) United States Patent
Park et al.

(10) Patent No.: US 12,256,477 B2
(45) Date of Patent: Mar. 18, 2025

(54) COOKING APPARATUS

(71) Applicant: Samsung Electronics Co., Ltd., Suwon-si (KR)

(72) Inventors: Geunyong Park, Suwon-si (KR); Juhee Kim, Suwon-si (KR); Junesang Mok, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 17/017,524

(22) Filed: Sep. 10, 2020

(65) Prior Publication Data

US 2021/0071872 A1 Mar. 11, 2021

(30) Foreign Application Priority Data

Sep. 10, 2019 (KR) ........................ 10-2019-0112238

(51) Int. Cl.

| | |
|---|---|
| ***H05B 6/12*** | (2006.01) |
| ***F24C 7/04*** | (2021.01) |
| ***F24C 7/08*** | (2006.01) |
| ***F24C 15/10*** | (2006.01) |
| ***F24C 15/36*** | (2006.01) |
| ***H05B 6/06*** | (2006.01) |

(52) U.S. Cl.

CPC ........... *H05B 6/1209* (2013.01); *F24C 7/043* (2013.01); *F24C 7/083* (2013.01); *F24C 15/10* (2013.01); *F24C 15/36* (2013.01); *H05B 6/062* (2013.01)

(58) Field of Classification Search

CPC ....... H05B 6/1209; H05B 6/062; F24C 7/043; F24C 7/083; F24C 15/10; F24C 15/36

See application file for complete search history.

(56) References Cited

U.S. PATENT DOCUMENTS 3,455,708 A 7/1969 Earl
3,547,898 A 12/1970 Shapiro
(Continued)

FOREIGN PATENT DOCUMENTS

EP 2013033 B1 6/2011
GB 795146 A 5/1958
(Continued)

OTHER PUBLICATIONS

Piping-world.com/piping-flanges-types-of-flanges-in-piping-systems, Jan. 2019 (Year: 2019).*
(Continued)

*Primary Examiner* — Thien S Tran

(57) ABSTRACT

A cooking apparatus including a plurality of physically separated glasses and a coupling member coupling the plurality of glasses. The cooking apparatus includes a first glass forming a first region, a second glass forming a second region separated from the first region, and the coupling member configured to couple the first glass and the second glass. Where the coupling member includes an upper flange configured to cover a portion of an upper surface of the first glass and a portion of an upper surface of the second glass to divide the first region and the second region, a lower flange configured to support a portion of a lower surface of the first glass and a portion of a lower surface of the second glass, and a column configured to connect the upper flange and the lower flange.

17 Claims, 16 Drawing Sheets

(56) References Cited

U.S. PATENT DOCUMENTS

| | | | | | |
|---|---|---|---|---|---|
| 5,317,129 | A * | 5/1994 | Taplan | F24C 15/102 126/39 B | |
| 5,530,224 | A * | 6/1996 | Sassman | H05B 3/74 219/452.12 | |
| 6,085,643 | A * | 7/2000 | Stedron | B29C 44/1228 99/422 | |
| 10,051,691 | B2 | 8/2018 | Verrat-Debailleul et al. | | |
| 10,076,003 | B2 | 9/2018 | Reischmann et al. | | |
| 10,932,329 | B2 | 2/2021 | Lee et al. | | |
| 2002/0197519 | A1 | 12/2002 | Einhart et al. | | |
| 2003/0183617 | A1 * | 10/2003 | Platt | F24C 7/083 219/460.1 | |
| 2008/0264931 | A1 * | 10/2008 | Vilato | C03C 17/00 219/622 | |
| 2009/0183725 | A1 | 7/2009 | Leikam et al. | | |
| 2014/0216435 | A1 * | 8/2014 | Mallet | F24C 15/10 126/211 | |
| 2016/0150596 | A1 | 5/2016 | Burkhardt et al. | | |

FOREIGN PATENT DOCUMENTS

| | | | |
|---|---|---|---|
| JP | H03-52287 | A | 3/1991 |
| JP | H04-97930 | A | 3/1992 |
| JP | 2004-353997 | A | 12/2004 |
| JP | 2007-139246 | A | 6/2007 |
| JP | 2014-234980 | A | 12/2014 |
| KR | 10-2013-0025502 | A | 3/2013 |
| KR | 10-2015-0089049 | A | 8/2015 |
| WO | 2007118744 | A1 | 10/2007 |
| WO | 2008029627 | A1 | 3/2008 |

OTHER PUBLICATIONS

International Search Report and Written Opinion of the International Searching Authority in connection with International Application No. PCT/KR2020/011593, Dec. 30, 2020, 8 pages.
Sungjin I Cool, "Depoinduction high-power multi-ball range 3.5kW standard control separation NNBK35," ICEPIA, Apr. 30, 2019, 2 pages.
Supplementary European Search Report dated Jun. 28, 2022 in connection with European Patent Application No. 20 86 3518, 8 pages.
Communication under Rule 71(2) EPC dated Sep. 14, 2023, in connection with European Application No. 20863518.5, 40 pages.
European Search Report dated Apr. 17, 2024, in connection with European Application No. 24152098.0, 8 pages.
Notice Requesting Submission of Opinion dated May 17, 2024, in connection with Korean Application No. 10-2019-0112238, 8 pages.
Notice Requesting Submission of Opinion dated May 17, 2024, in connection with Korean Application No. 10-2023-0008336, 11 pages.

* cited by examiner

COOKING APPARATUS

CROSS-REFERENCE TO RELATED APPLICATION

This application is based on and claims priority under 35 U.S.C. § 119 to Korean Patent Application No. 10-2019-0112238, filed on Sep. 10, 2019, in the Korean Intellectual Property Office, the disclosure of which is incorporated by reference herein in its entirety.

BACKGROUND

1. Field

The disclosure relates to a cooking apparatus, and more particularly, to a cooking apparatus including a plurality of glasses.

2. Description of the Related Art

In general, an induction heating cooking apparatus is a cooking apparatus that cooks food by heating a cooking container using the principle of induction heating. The induction heating cooking apparatus may include a glass on which the cooking container is placed, and an induction heating coil disposed below the glass and generating a magnetic field when a current is applied.

When a current is applied to the induction heating coil and a magnetic field is generated, a secondary current is induced to a cooking container, and Joule heat is generated by the electrical resistance of the cooking container itself. By the Joule heat, the cooking container is heated and food contained in the cooking container is heated.

The induction heating cooking apparatus may provide rapid heating, no harmful gas generation, and no risk of fire, compared to a gas range and a kerosene stove burning fossil fuels such as gas and oil to heat a cooking container through the heat of combustion.

The glass of the induction heating cooking apparatus may be not only provided with a cooking region on which a cooking container is placed, but also a control region displaying various kinds of information and receiving a control instruction from a user.

However, when a cooking region on which a cooking container is placed and a control region displaying various kinds of information and receiving a control instruction from a user are provided on a single glass, the respective regions are not physically separated, so that a user may accidentally touch the cooking region of a high-temperature.

SUMMARY

It is an aspect of the disclosure to provide a cooking apparatus including a plurality of glasses physically separated from each other.

It is another aspect of the disclosure to provide a cooking apparatus including a plurality of glasses having different colors.

It is another aspect of the disclosure to provide a cooking apparatus in which a cooking region and a control region are provided on different glasses.

It is another aspect of the disclosure to provide a cooking apparatus capable of preventing foreign substances from entering a gap between a coupling member coupling a plurality of glasses and the glass.

Additional aspects of the disclosure will be set forth in part in the description which follows and, in part, will be obvious from the description, or may be learned by practice of the disclosure.

In accordance with an aspect of the disclosure, a cooking apparatus includes a first glass forming a first region, a second glass forming a second region separated from the first region, and a coupling member configured to couple the first glass and the second glass, wherein the coupling member includes an upper flange configured to cover a portion of an upper surface of the first glass and a portion of an upper surface of the second glass to divide the first region and the second region, a lower flange configured to support a portion of a lower surface of the first glass and a portion of a lower surface of the second glass, and a column configured to connect the upper flange and the lower flange.

The coupling member may further include an insertion groove formed by the upper flange, the lower flange and the column and into which the first glass or the second glass is inserted.

The cooking apparatus may further include an adhesive member disposed in the insertion groove to adhere the first glass or the second glass to the coupling member.

The upper flange may include an upper groove into which the adhesive member is inserted to increase a contact area between the adhesive member and the first glass or the second glass, and the upper groove may be formed by recessing a lower surface of the upper flange upward.

The upper groove may include opposite side surfaces and an upper surface, and one side surface of the upper groove may extend upward from a side surface of the column.

The upper groove may be formed such that one side surface of the upper groove is opened.

The lower flange may include a lower groove into which the adhesive member is inserted to increase a contact area between the adhesive member and the first glass or the second glass, and the lower groove may be formed by recessing an upper surface of the lower flange downward.

The lower groove may include opposite side surfaces and a lower surface, and one side surface of the lower groove may extend downward from a side surface of the column.

The lower groove may be formed such that one side surface of the lower groove is opened.

The upper flange may include a first upper flange extending from a center line of the column toward the first glass, and a second upper flange extending from the center line of the column toward the second glass.

A length in which the first upper flange extends from the center line toward the first glass may be shorter than a length in which the second upper flange extends from the center line toward the second glass.

The cooking apparatus may further include a sealing member configured to block foreign substances from entering a gap between a lower surface of the upper flange and the upper surface of the first glass or the upper surface of the second glass.

The first glass may have a first color, and the second glass may have a second color different from the first color.

The first region may be provided as a cooking region for heating a cooking container.

The second region may be provided as a control region for receiving a control instruction from a user.

In accordance with another aspect of the disclosure, a cooking apparatus includes a first glass having a first color and forming a first region on which a cooking container is placed, a second glass having a second color different from the first color and forming a second region receiving a control instruction of a user, and a coupling member configured to couple the first glass and the second glass and divide the first region and the second region.

The coupling member may include an upper flange configured to cover a portion of an upper surface of the first glass and a portion of an upper surface of the second glass to divide the first region and the second region, a lower flange configured to support a portion of a lower surface of the first glass and a portion of a lower surface of the second glass, and a column configured to connect the upper flange and the lower flange.

The upper flange may include an upper groove formed by recessing a lower surface of the upper flange upward.

The lower flange may include a lower groove formed by recessing an upper surface of the lower flange downward.

The upper flange may include a first upper flange extending from a center line of the column toward the first glass and a second upper flange extending from the center line of the column toward the second glass.

A length in which the first upper flange extends from the center line toward the first glass may be shorter than a length in which the second upper flange extends from the center line toward the second glass.

In accordance with another aspect of the disclosure, a cooking apparatus includes a first glass forming a first region, a second glass forming a second region separated from the first region, and a coupling member configured to couple the first glass and the second glass and comprising an upper flange dividing the first region and the second region, wherein a size of a region where the upper flange covers the first glass is larger than a size of a region where the upper flange covers the second glass.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Configurations shown in the embodiments and the drawings described in the present specification are only the preferred embodiments of the present disclosure, and thus it is to be understood that various modified examples, which may replace the embodiments and the drawings described in the present specification, are possible when filing the present application.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component.

The terms “front end,” “rear end,” “upper portion,” “lower portion,” “upper end” and “lower end” used in the following description are defined with reference to the drawings, and the shape and position of each component are not limited by these terms.

Hereinafter, an induction heating cooking apparatus will be described as an example of cooking apparatuses. However, the disclosure is not limited thereto, and may include a highlight type cooking apparatus. In addition, the disclosure will describe a cooking apparatus separately provided as an example, but unlike this, the cooking apparatus may be integrally provided on the top of the oven.

Figure 1:
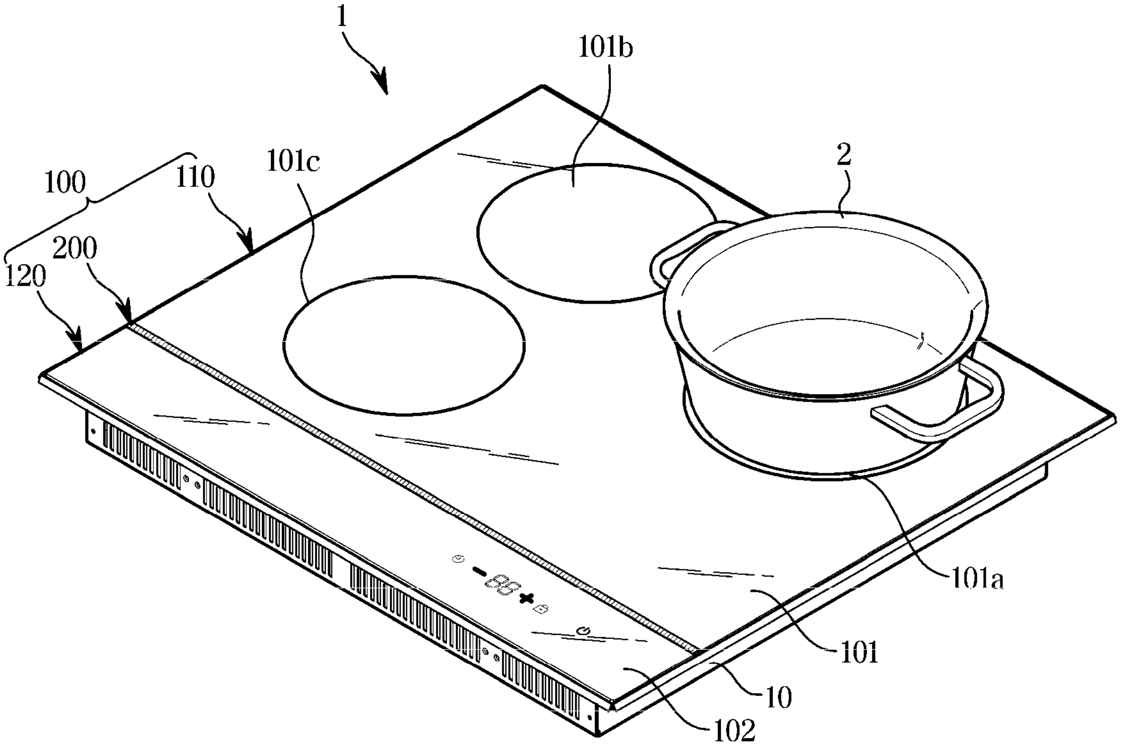
FIG. 1 is a perspective view of a cooking apparatus according to an embodiment of the disclosure.
Figure 2:
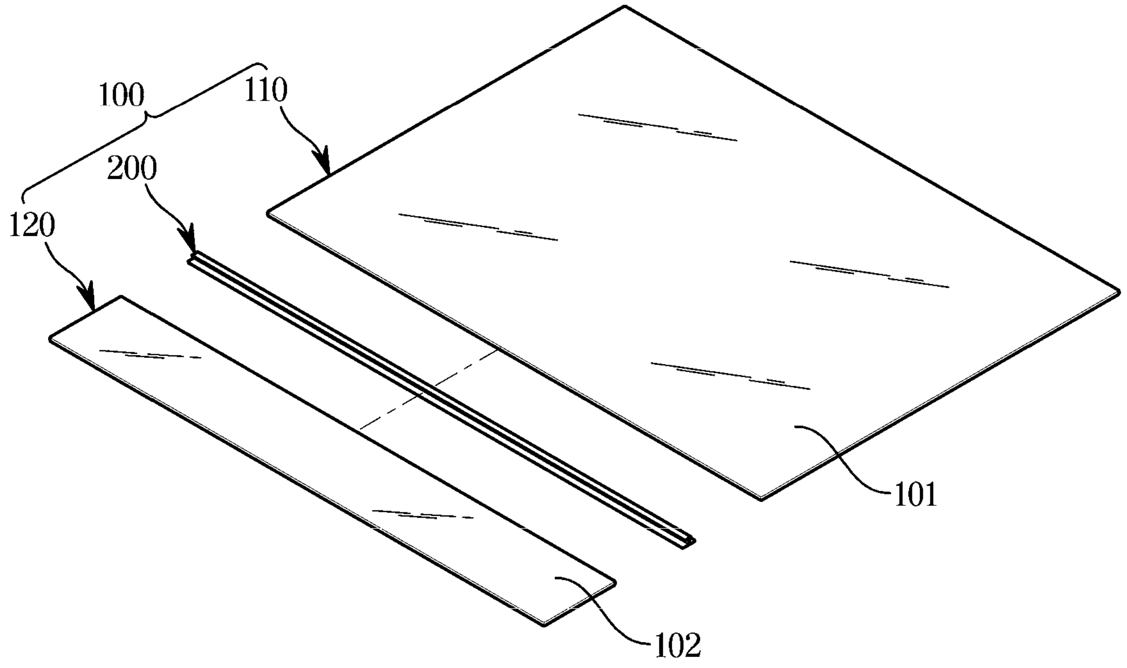
FIG. 2 is a view illustrating glasses and a coupling member separately in the cooking apparatus according to an embodiment of the disclosure.

FIG. 1 is a perspective view of a cooking apparatus according to an embodiment of the disclosure, and FIG. 2 is a view illustrating glasses and a coupling member separately in the cooking apparatus according to an embodiment of the disclosure.

Referring to FIG. 1, a cooking apparatus 1 includes a main body 10, a first glass 110 of a heat-resistant material positioned above the main body 10, including heating region guides 101*a*, 101*b*, and 101*c*, and supporting a cooking container 2, a second glass 120 including an input unit to receive a control instruction from a user and a display unit to display various kinds of information about the cooking apparatus 1, a coupling member 200 to couple the first glass 110 and the second glass 120, and a working coil (not shown) disposed inside the main body 10 to generate a magnetic field to induction heat the cooking container 2.

A glass 100 may include the first glass 110 and the second glass 120. The first glass 110 and the second glass 120 are physically separated and may be coupled through the coupling member 200.

The first glass 110 forms the first region 101, the cooking container 2 may be disposed in the first region 101, and the cooking container 2 disposed on the first glass 110 may be induction heated by a magnetic field generated by the working coil (not shown).

The second glass 120 forms the second region 102 separated from the first region 101, and cooking information of the cooking apparatus 1 including a temperature, a cooking elapsed time and/or date/time of the cooking container 2 may be displayed on the second region 102.

The second region 102 may also be provided with the input unit to receive a control instruction from a user to turn on/off the cooking apparatus 1 or to control the temperature of the cooking container 2.

Referring to FIG. 2, at least a portion of the first glass 110 may be coupled to one side of the coupling member 200. At least a portion of the second glass 120 may be coupled to the other side of the coupling member 200. The coupling member 200 may not only couple the first glass 110 and the second glass 120, but also divide the first region 101 and the second region 102.

Figure 3:
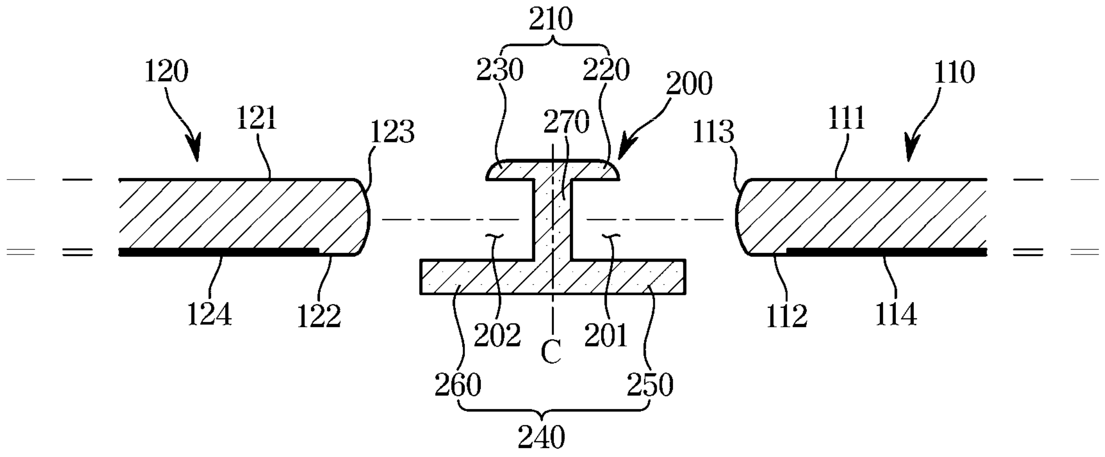
FIG. 3 illustrates cross-sections of the glasses and the coupling member before being coupled in the cooking apparatus according to an embodiment of the disclosure.
Figure 4:
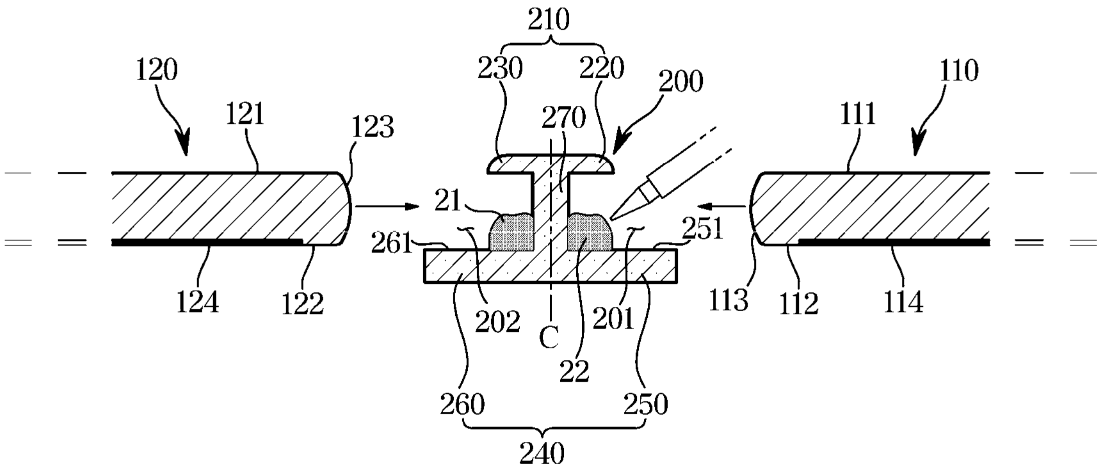
FIG. 4 illustrates that an adhesive member is applied to the coupling member in FIG. 3.
Figure 5:
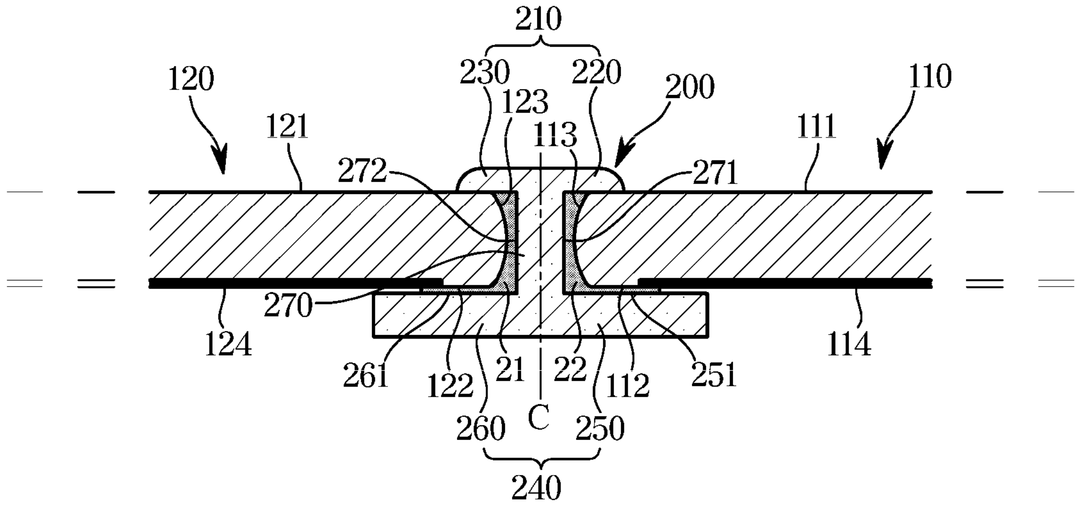
FIG. 5 illustrates that the glasses are coupled to the coupling member in FIG. 4.

FIG. 3 illustrates cross-sections of the glasses and the coupling member before being coupled in the cooking apparatus according to an embodiment of the disclosure, FIG. 4 illustrates that an adhesive member is applied to the coupling member in FIG. 3, and FIG. 5 illustrates that the glasses are coupled to the coupling member in FIG. 4.

Hereinafter, a process of coupling the glasses to the coupling member in the cooking apparatus according to an embodiment of the disclosure will be described in detail with reference to FIGS. 3 to 5.

Referring to FIG. 3, the first glass 110 may include an upper surface 111, a lower surface 112, a side surface 113, and a painted surface 114. The first glass 110 may have a first color, and the painted surface 114 may exhibit the first color.

The second glass 120 may include an upper surface 121, a lower surface 122, a side surface 123, and a painted surface 124. The second glass 120 may have a second color, and the painted surface 124 may exhibit the second color.

According to an embodiment of the disclosure, the first color and the second color may be different. In other words, the color of the first glass 110 and the color of the second glass 120 may be different. Through such a configuration, the cooking apparatus 1 of various designs may be implemented. However, the disclosure is not limited thereto, and the first color and the second color may be the same. Accordingly, the first glass 110 and the second glass 120 may be divided by the coupling member 200 and provided in the same color.

The coupling member 200 may include an upper flange 210 to cover a portion of an upper surface of the glass 100, a lower flange 240 to support a portion of the lower surface of the glass 100, and a column 270 connecting the upper flange 210 and the lower flange 240.

The upper flange 210 may include a first upper flange 220 extending toward the first glass 110 from a center line C symmetrically dividing the column 270, and a second upper flange 230 extending toward the second glass 120 from the center line C.

The lower flange 240 may include a first lower flange 250 extending toward the first glass 110 from the center line C, and a second lower flange 260 extending toward the second glass 120 from the center line C.

The coupling member 200 may include a first insertion groove 201 formed by the first upper flange 220, the first lower flange 250 and the column 270.

The column 270 may include both side surfaces 271 and 272.

The coupling member 200 may also include a second insertion groove 2021 formed by the second upper flange 230, the second lower flange 260 and the column 270.

Referring to FIG. 4, adhesive members 21 and 22 may be applied to the first insertion groove 201 and the second insertion groove 202, respectively. The adhesive members 21 and 22 may be provided to adhere the glass 100 and the coupling member 200. The adhesive members 21 and 22 may be applied in a liquid state and solidified. For example, the adhesive members 21 and 22 may include silicone.

Referring to FIG. 5, the first glass 110 and the second glass 120 may be inserted into the first insertion groove 201 and the second insertion groove 202, respectively.

The first glass 110 may be coupled to the coupling member 200 by being inserted into the first insertion groove 201. The first glass 110 may be temporarily fixed by being inserted into the first insertion groove 201. The adhesive member 22 may be disposed between the first glass 110 and the coupling member 200 to adhere the first glass 110 and the coupling member 200. Specifically, when the first glass 110 is inserted into the first insertion groove 201, the adhesive member 22 in a liquid state applied to the first insertion groove 201 may move to a gap between the first insertion groove 201 and the first glass 110 and then be solidified, thereby adhering the first glass 110 to the first insertion groove 201. At this time, the adhesive member 22 may be in contact with the side surface 113 of the first glass 110, and may be in contact with the upper surface 111 and/or the lower surface 112 of the first glass 110.

The second glass 120 may be coupled to the coupling member 200 by being inserted into the second insertion groove 202. The second glass 120 may be temporarily fixed by being inserted into the second insertion groove 202. The adhesive member 21 may be disposed between the second glass 120 and the coupling member 200 to adhere the second glass 120 and the coupling member 200. Specifically, when the second glass 120 is inserted into the second insertion groove 202, the adhesive member 21 in a liquid state applied to the second insertion groove 202 may move to a gap between the second insertion groove 202 and the second glass 120 and then be solidified, thereby adhering the second glass 120 to the second insertion groove 202. At this time, the adhesive member 21 may be in contact with the side surface 123 of the second glass 120, and may be in contact with the upper surface 121 and/or the lower surface 122 of the second glass 120.

Figure 6:
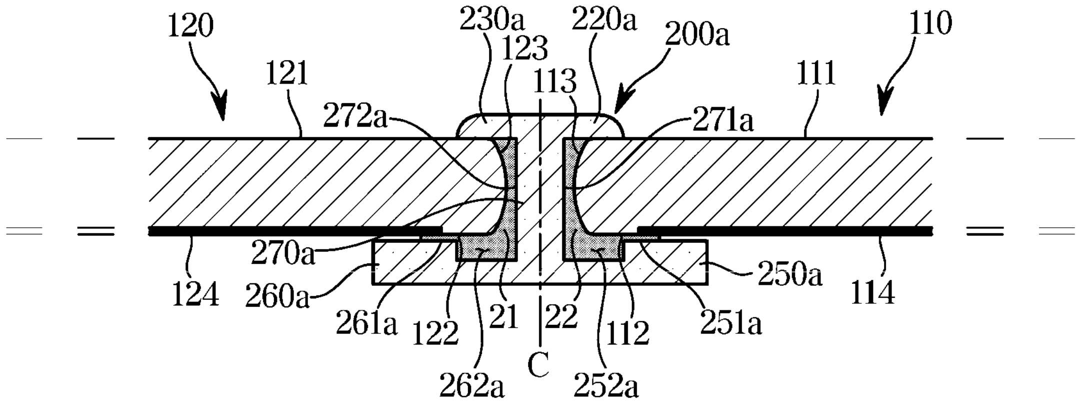
FIG. 6 illustrates cross-sections of glasses and a coupling member in a cooking apparatus according to another embodiment of the disclosure.

FIG. 6 illustrates cross-sections of glasses and a coupling member in a cooking apparatus according to another embodiment of the disclosure.

Referring to FIG. 6, a coupling member 200*a* may include a first upper flange 220*a*, a second upper flange 230*a*, a column 270*a*, lower grooves 252*a* and 262*a* formed by recessing an upper surface of a lower flange 240*a* downward.

Specifically, a first lower flange 250*a* may include the first lower groove 252*a* formed by recessing an upper surface 251*a* of the first lower flange 250*a* downward. A second lower flange 260*a* may include the second lower groove 262*a* formed by recessing an upper surface 261*a* of the second lower flange 260*a* downward.

The first lower groove 252*a* may include an upper surface and opposite side surfaces. One side surface of the first lower groove 252*a* may be formed by extending downward from a side surface 271*a* of the column 270. In other words, one side surface of the first lower groove 252*a* may form a portion of the side surface 271*a* of the column 270. Alternatively, one side surface of the first lower groove 252*a* may be formed on the same surface as the side surface 271*a* of the column 270.

The second lower groove 262*a* may include an upper surface and opposite side surfaces. One side surface of the second lower groove 262*a* may be formed by extending downward from a side surface 272*a* of the column 270. In other words, one side surface of the second lower groove 262*a* may form a portion of the side surface 272*a* of the column 270. Alternatively, one side surface of the second lower groove 262*a* may be formed on the same surface as the side surface 272*a* of the column 270.

The first lower groove 252*a* may increase a contact area between the first glass 110 and the adhesive member 22. The adhesive member 22 may be inserted into the first lower groove 252*a*, and the adhesive member 22 inserted into the first lower groove 252*a* may come into contact with the lower surface 112 of the first glass 110. A gap between the first glass 110 and the upper surface 251*a* of the first lower flange 250*a* may be very small. As described above, when the gap between the first glass 110 and the first lower flange 250*a* is small, the movement of the adhesive member 22 having a high viscosity into the gap between the first glass 110 and the first lower flange 250*a* is difficult. When the contact area between the adhesive member 22 and the first glass 110 increases, an adhesive force of the adhesive member 22 becomes strong. When the first lower groove 252*a* is formed, the adhesive member 22 may move to the first lower groove 252*a*, and the adhesive member 22 accommodated in the first lower groove 252*a* may come into contact with the first glass 110. Accordingly, the contact area between the adhesive member 22 and the first glass 110 may increase, and a coupling force between the first glass 110 and the coupling member 200 may increase.

Similarly, as the second lower groove 262*a* is formed, the adhesive member 21 may be introduced into the second lower groove 262*a*, and a coupling force between the second glass 120 and the coupling member 200 may increase.

Figure 7:
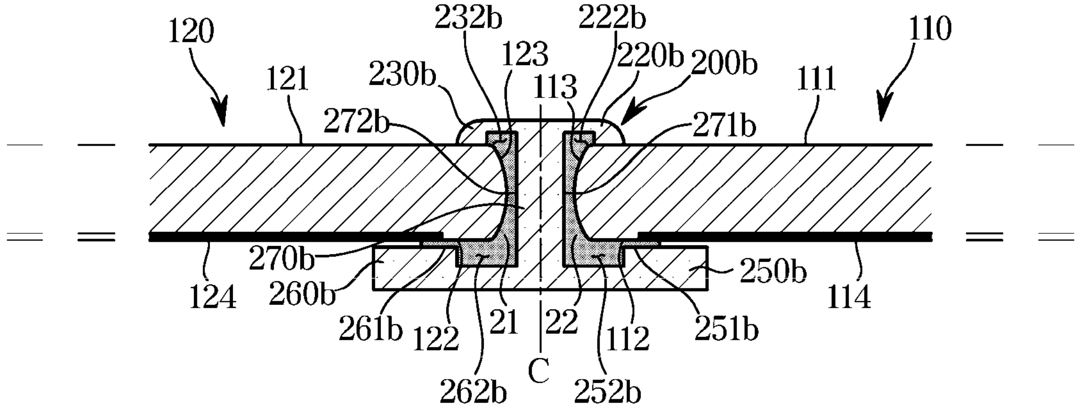
FIG. 7 illustrates cross-sections of glasses and a coupling member in a cooking apparatus according to another embodiment of the disclosure.

FIG. 7 illustrates cross-sections of glasses and a coupling member in a cooking apparatus according to another embodiment of the disclosure.

Referring to FIG. 7, a coupling member 200*b* may include a column 270*b*, a first lower flange 250*b* having an upper surface 251*b*, a second lower flange 260*b* having an upper surface 261*b*, upper grooves 222*b* and 232*b* as well as lower grooves 252*b* and 262*b*.

A first upper flange 220*b* may include the first upper groove 222*b* formed by recessing a lower surface of the first upper flange 220*b* upward. A second upper flange 230*b* may include the second upper groove 232*b* formed by recessing a lower surface of the second upper flange 230*b* upward.

The first upper groove 222*b* may include an upper surface and opposite side surfaces. One side surface of the first upper groove 222*b* may be formed by extending upward from a side surface 271*b* of the column 270. In other words, one side surface of the first upper groove 222*b* may form a portion of the side surface 271*b* of the column 270. Alternatively, one side surface of the first upper groove 222*b* may be formed on the same surface as the side surface 271*b* of the column 270.

The second upper groove 232*b* may include an upper surface and opposite side surfaces. One side surface of the second upper groove 232*b* may be formed by extending upward from a side surface 272*b* of the column 270. In other words, one side surface of the second upper groove 232*b* may form a portion of the side surface 272*b* of the column 270. Alternatively, one side surface of the second upper groove 232*b* may be formed on the same surface as the side surface 272*b* of the column 270.

The first upper groove 222*b* may increase a contact area between the first glass 110 and the adhesive member 22. The adhesive member 22 may be inserted into the first upper groove 222*b*, and the adhesive member 22 inserted into the first upper groove 222*b* may come into contact with the upper surface 111 of the first glass 110. A gap between the first glass 110 and the lower surface of the first upper flange 220*b* may be very small. As described above, when the gap between the first glass 110 and the first upper flange 220*b* is small, the movement of the adhesive member 22 having a high viscosity into the gap between the first glass 110 and the first upper flange 220*b* is difficult. When the contact area between the adhesive member 22 and the first glass 110 increases, an adhesive force of the adhesive member 22 becomes strong. When the first upper groove 222*b* is formed, the adhesive member 22 may move to the first upper groove 222*b*, and the adhesive member 22 accommodated in the first upper groove 222*b* may come into contact with the first glass 110. Accordingly, the contact area between the adhesive member 22 and the first glass 110 may increase, and a coupling force between the first glass 110 and the coupling member 200 may increase.

Similarly, as the second upper groove 232*b* is formed, the adhesive member 21 may be introduced into the second upper groove 232*b*, and a coupling force between the second glass 120 and the coupling member 200 may increase.

Figure 8:
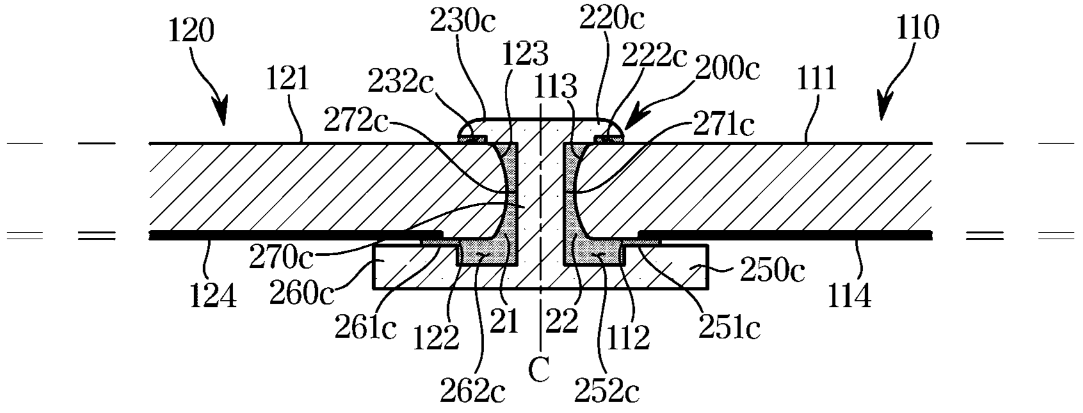
FIG. 8 illustrates cross-sections of glasses and a coupling member in a cooking apparatus according to another embodiment of the disclosure.

FIG. 8 illustrates cross-sections of glasses and a coupling member in a cooking apparatus according to another embodiment of the disclosure.

Referring to FIG. 8, a coupling member 200*c* may include a column 270*c* having both side surfaces 271*c* and 272*c*, a first lower flange 250*c* having an upper surface 251*c*, a second lower flange 260*c* having an upper surface 261*c*, upper grooves 222*c* and 232*c* having an open side as well as lower grooves 252*c* and 262*c*.

A first upper flange 220*c* may include the third upper groove 222*c* formed by recessing a lower surface of the first upper flange 220*c* upward and having the open side. A second upper flange 230*c* may include the fourth upper groove 232*c* formed by recessing a lower surface of the second upper flange 230*c* upward and having the open side.

The third upper groove 222*c* may increase a contact area between the first glass 110 and the adhesive member 22. The adhesive member 22 may be inserted into the third upper groove 222*c*, and the adhesive member 22 inserted into the third upper groove 222*c* may come into contact with the lower surface 112 of the first glass 110. A gap between the first glass 110 and the lower surface of the first upper flange 220*c* may be very small. As described above, when the gap between the first glass 110 and the first upper flange 220*c* is small, the movement of the adhesive member 22 having a high viscosity into the gap between the first glass 110 and the first upper flange 220*c* is difficult. When the contact area between the adhesive member 22 and the first glass 110 increases, an adhesive force of the adhesive member 22 becomes strong. When the third upper groove 222*c* is formed, the adhesive member 22 may move to the third upper groove 222*c*, and the adhesive member 22 accommodated in the third upper groove 222*c* may come into contact with the first glass 110. Accordingly, the contact area between the adhesive member 22 and the first glass 110 may increase, and a coupling force between the first glass 110 and the coupling member 200 may increase.

Similarly, as the fourth upper groove 232*c* is formed, the adhesive member 21 may be introduced into the fourth upper groove 232*c*, and a coupling force between the second glass 120 and the coupling member 200 may increase.

Figure 9:
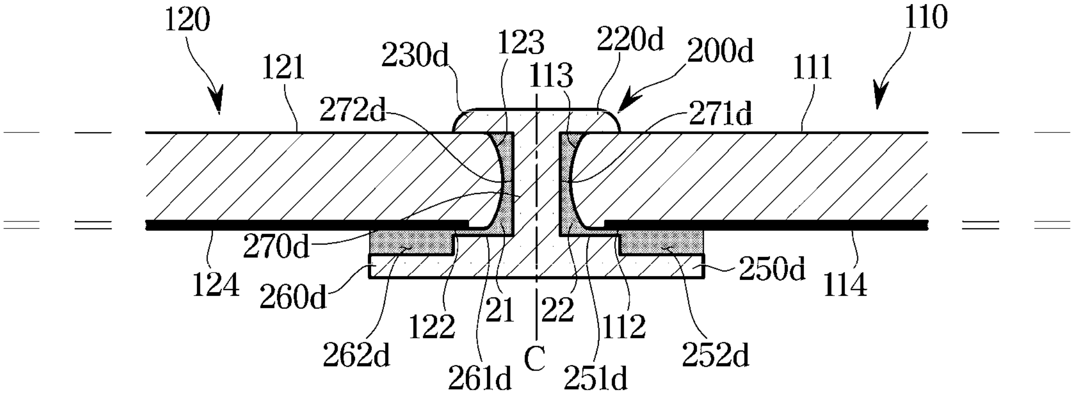
FIG. 9 illustrates cross-sections of glasses and a coupling member in a cooking apparatus according to another embodiment of the disclosure.

FIG. 9 illustrates cross-sections of glasses and a coupling member in a cooking apparatus according to another embodiment of the disclosure.

Referring to FIG. 9, a coupling member 200*d* may include a column 270*d* having both side surfaces 271*d* and 272*d*, a first upper flange 220*d*, a second upper flange 230*d*, a first lower flange 250*d* having an upper surface 251*d*, a second lower flange 260*d* having an upper surface 261*d*, lower grooves 252*d* and 262*d* having an open side.

A first lower flange 250*d* may include the third lower groove 252*d* formed by recessing an upper surface of the first lower flange 250*d* downward and having the open side. A second lower flange 260*d* may include the fourth lower groove 262*d* formed by recessing an upper surface of the second lower flange 260*d* downward and having the open side.

The third lower groove 252*d* may increase a contact area between the first glass 110 and the adhesive member 22. The adhesive member 22 may be inserted into the third lower groove 252*d*, and the adhesive member 22 inserted into the third lower groove 252*d* may come into contact with the lower surface 112 of the first glass 110. A gap between the first glass 110 and the upper surface of the first lower flange 250*d* may be very small. As described above, when the gap between the first glass 110 and the first lower flange 250*d* is small, the movement of the adhesive member 22 having a high viscosity into the gap between the first glass 110 and the first lower flange 250*d* is difficult. When the contact area between the adhesive member 22 and the first glass 110 increases, an adhesive force of the adhesive member 22 becomes strong. When the third lower groove 252*d* is formed, the adhesive member 22 may move to the third lower groove 252*d*, and the adhesive member 22 accommodated in the third lower groove 252*d* may come into contact with the first glass 110. Accordingly, the contact area between the adhesive member 22 and the first glass 110 may increase, and a coupling force between the first glass 110 and the coupling member 200 may increase.

Similarly, as the fourth lower groove 262*d* is formed, the adhesive member 21 may be introduced into the fourth lower groove 262*d*, and a coupling force between the second glass 120 and the coupling member 200 may increase.

Figure 10:
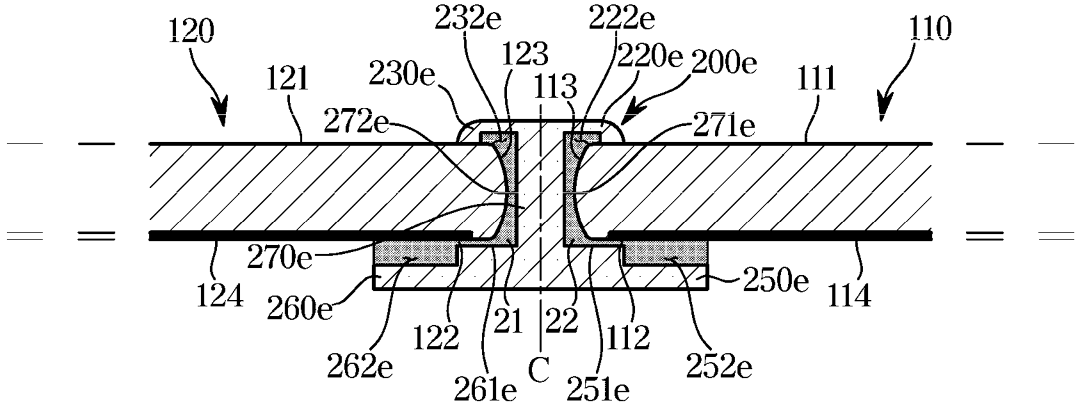
FIG. 10 illustrates cross-sections of glasses and a coupling member in a cooking apparatus according to another embodiment of the disclosure.

FIG. 10 illustrates cross-sections of glasses and a coupling member in a cooking apparatus according to another embodiment of the disclosure.

Referring to FIG. 10, a coupling member 200*e* may include a column 270*e* having both side surfaces 271*e* and 272*e*, a first upper flange 220*e*, a second upper flange 230*e*, a first lower flange 250*e* having an upper surface 251*e*, a second lower flange 260*e* having an upper surface 261*e*, upper grooves 222*e* and 232*e* as well as lower grooves 252*e* and 262*e* having an open side. The upper grooves 222*e* and 232*e* have the same structures and functions as the upper grooves 222*b* and 232*b* described with reference to FIG. 7, and thus redundant descriptions will be omitted.

Figure 11:
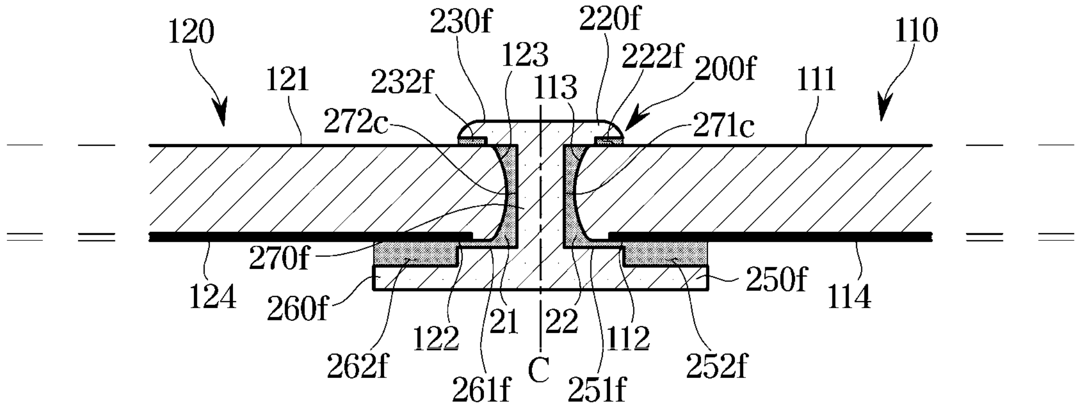
FIG. 11 illustrates cross-sections of glasses and a coupling member in a cooking apparatus according to another embodiment of the disclosure.

FIG. 11 illustrates cross-sections of glasses and a coupling member in a cooking apparatus according to another embodiment of the disclosure.

Referring to FIG. 11, a coupling member 200*f* may include a column 270*f* having both side surfaces 271*f* and 272*f*, a first upper flange 220*f*, a second upper flange 230*f*, a first lower flange 250*f* having an upper surface 251*f*, a second lower flange 260*f* having an upper surface 261*f*, upper grooves 222*f* and 232*f* having an open side as well as lower grooves 252*f* and 262*f* having an open side. The upper grooves 222*f* and 232*f* have the same structures and functions as the upper grooves 222*c* and 232*c* described with reference to FIG. 8, and thus redundant descriptions will be omitted.

Figure 12:
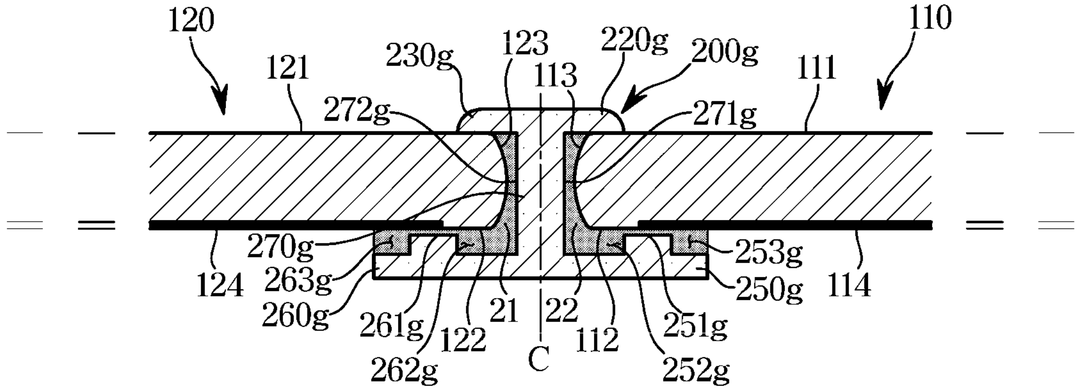
FIG. 12 illustrates cross-sections of glasses and a coupling member in a cooking apparatus according to another embodiment of the disclosure.

FIG. 12 illustrates cross-sections of glasses and a coupling member in a cooking apparatus according to another embodiment of the disclosure.

Referring to FIG. 12, a coupling member 200*g* may include a column 270*g* having both side surfaces 271*g* and 272*g*, a first upper flange 220*g*, a second upper flange 230*g*, a first lower flange 250*g* having an upper surface 251*g*, a second lower flange 260*g* having an upper surface 261*g*, all of the two types of lower grooves described above. Specifically, the coupling member 200*g* may include a first lower groove 252*g* and a second lower groove 262*g*, and also include a third lower groove 253*g* and a fourth lower groove 263*g*. As such, when the first to fourth lower grooves 252*g*, 262*g*, 253*g*, and 263*g* are provided, the contact area between the adhesive members 21 and 22 and the glass 100 may increase more than when including any one type of lower groove. The first to fourth lower grooves 252*g*, 262*g*, 253*g*, and 263*g* are the same structures and functions as the first to fourth lower grooves described with reference to FIGS. 6 to 11, and thus redundant descriptions will be omitted.

Figure 13:
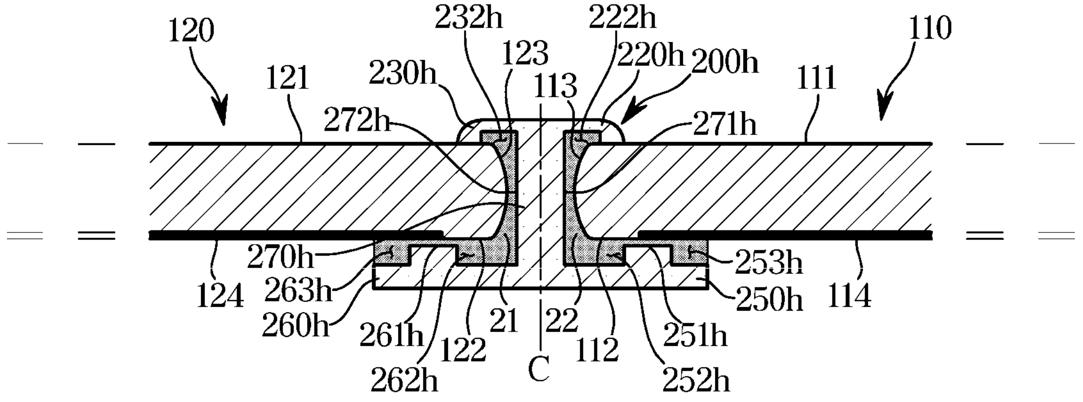
FIG. 13 illustrates cross-sections of glasses and a coupling member in a cooking apparatus according to another embodiment of the disclosure.

FIG. 13 illustrates cross-sections of glasses and a coupling member in a cooking apparatus according to another embodiment of the disclosure.

Referring to FIG. 13, a coupling member 200*h* may include a column 270*h* having both side surfaces 271*h* and 272*h*, a first upper flange 220*h*, a second upper flange 230*h*, a first lower flange 250*h* having an upper surface 251*h*, a second lower flange 260*h* having an upper surface 261*h*, upper grooves 222*h* and 232*h* as well as first to fourth lower grooves 252*h*, 262*h*, 253*h*, and 263*h*. The upper grooves 222*h* and 232*h* have the same structures and functions as the upper grooves 222*b* and 232*b* described with reference to FIG. 7, and thus redundant descriptions will be omitted.

Figure 14:
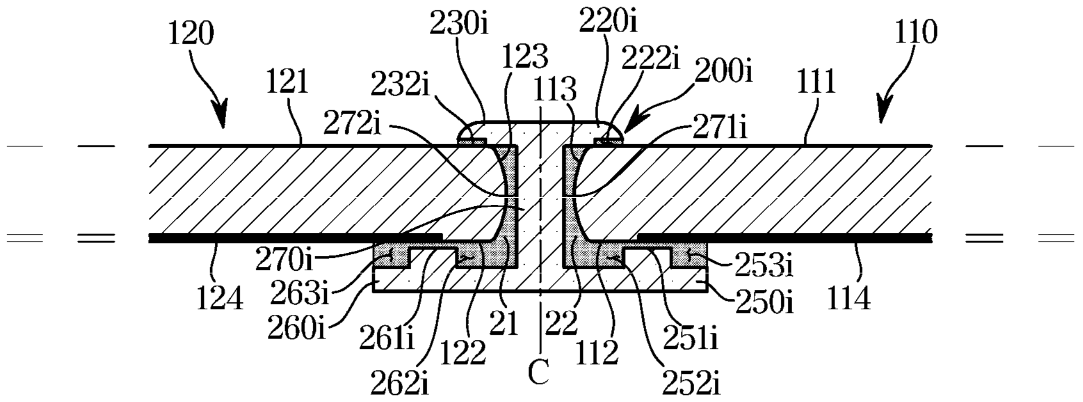
FIG. 14 illustrates cross-sections of glasses and a coupling member in a cooking apparatus according to another embodiment of the disclosure.

FIG. 14 illustrates cross-sections of glasses and a coupling member in a cooking apparatus according to another embodiment of the disclosure.

Referring to FIG. 14, a coupling member 200*i* may include a column 270*i* having both side surfaces 271*i* and 272*i*, a first upper flange 220*i*, a second upper flange 230*i*, a first lower flange 250*i* having an upper surface 251*i*, a second lower flange 260*i* having an upper surface 261*i*, upper grooves 222*i* and 232*i* as well as first to fourth lower grooves 252*i*, 262*i*, 253*i*, and 263*i*. The upper grooves 222*i* and 232*i* have the same structures and functions as the upper grooves 222*c* and 232*c* described with reference to FIG. 8, and thus redundant descriptions will be omitted.

Figure 15:
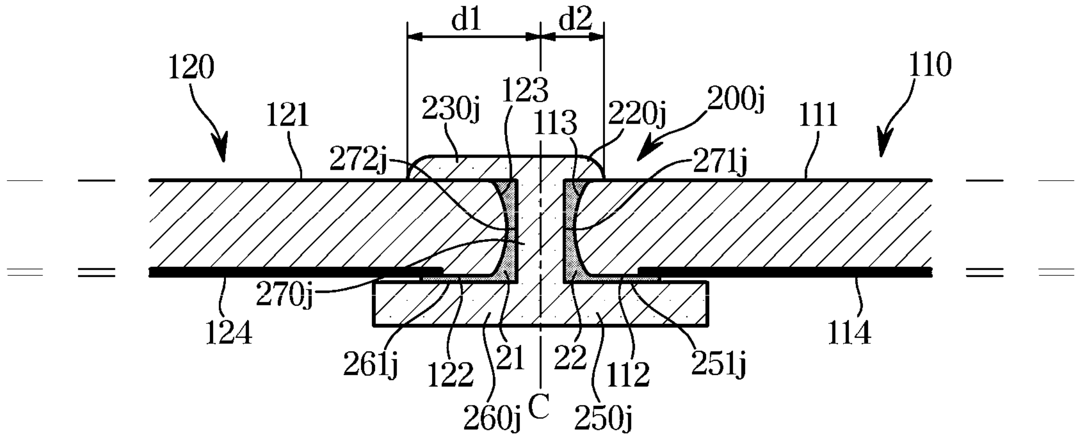
FIG. 15 illustrates cross-sections of glasses and a coupling member in a cooking apparatus according to another embodiment of the disclosure.

FIG. 15 illustrates cross-sections of glasses and a coupling member in a cooking apparatus according to another embodiment of the disclosure.

A coupling member 200*j* may include a column 270*j* having both side surfaces 271*j* and 272*j*, a first upper flange 220*j*, a second upper flange 230*j*, a first lower flange 250*j* having an upper surface 251*j*, a second lower flange 260*j* having an upper surface 261*j*, upper grooves 222*j* and 232*j* as well as first to fourth lower grooves 252*j*, 262*j*, 253*j*, and 263*j*.

Referring to FIG. 15, a length d2 in which a first upper flange 220*j* extends from the center line C of a column 270*j* toward the first glass 110 may be shorter than a length d1 in which a second upper flange 230*j* extends from the center line C of the column 270*j* toward the second glass 120. Hereinafter, the sum of d1 and d2 is referred to as a width of an upper flange 210*j*.

As illustrated in FIG. 15, as the first upper flange 220*j* and the second upper flange 230*j* are provided asymmetrically, the upper flange 210*j* may effectively cover the glass 100 while having the same width.

According to an embodiment of the disclosure, the glass 100 may be made of a transparent material. The glass 100 is transparently provided, and a painted surface provided on the lower surface of the glass 100 may allow the glass 100 to have a predetermined color.

When the glass 100 is provided transparently, the adhesive members 21 and 22 applied to the insertion grooves 201 and 202 may be seen from the outside through the transparent glass 100. When the adhesive members 21 and 22 are uniformly applied, it may not be a problem even when the adhesive members 21 and 22 are visible to a user from the outside. However, the adhesive members 21 and 22 may be disposed non-uniformly in the insertion grooves 201 and 202 due to reasons such as non-uniform applying in the process of applying the adhesive members 21 and 22 and shrinkage in the process of curing the adhesive members 21 and 22. As such, when the adhesive members 21 and 22 is disposed non-uniformly in the insertion grooves 201 and 202, the user may regard this state as not neat or consider it defective. Therefore, it is required that the non-uniform arrangement of the adhesive members 21 and 22 is not visible from the outside.

The upper flange 210*j* may cover a portion of the upper surface of the glass 100 so that the adhesive members 21 and 22 disposed on a side surface or the lower surface of the glass 100 are not visible from the outside. The easiest way to prevent the adhesive members 21 and 22 from being visible from the outside is to increase the width of the upper flange 210*j*, but this may act as a factor that deteriorates the aesthetic sensibility of the cooking apparatus 1. Therefore, it is important to adequately maintain a thickness of the upper flange 210*j* and cover a portion of the upper surface of the glass 100 so that the adhesive members 21 and 22 are not visible from the outside.

According to an embodiment of the disclosure, a cooking region may be provided on the first glass 110, and a control region may be provided on the second glass 120. For convenience of use, it is appropriate that the control region is placed closer to a user than the cooking region. According to this arrangement, the user's gaze is directed toward the cooking apparatus 1 in a diagonal line from the top of the second glass 120. Referring to FIG. 15, the user's gaze is directed toward the cooking apparatus 1 in a diagonal direction from an upper left in the drawing. On the other hand, the user generally does not look at the cooking apparatus 1 in the diagonal direction from an upper right in the drawing. In consideration of this specific point of use, in the cooking apparatus 1 according to an embodiment of the disclosure, the width d1 of the second upper flange 230*j* may be larger than the width d2 of the first upper flange 220*j*. Through this configuration, the width (d1+d2) of the upper flange 210*j* may be maintained, and at the same time it may be effectively prevented from viewing the adhesive members 21 and 22 from the outside.

Figure 16:
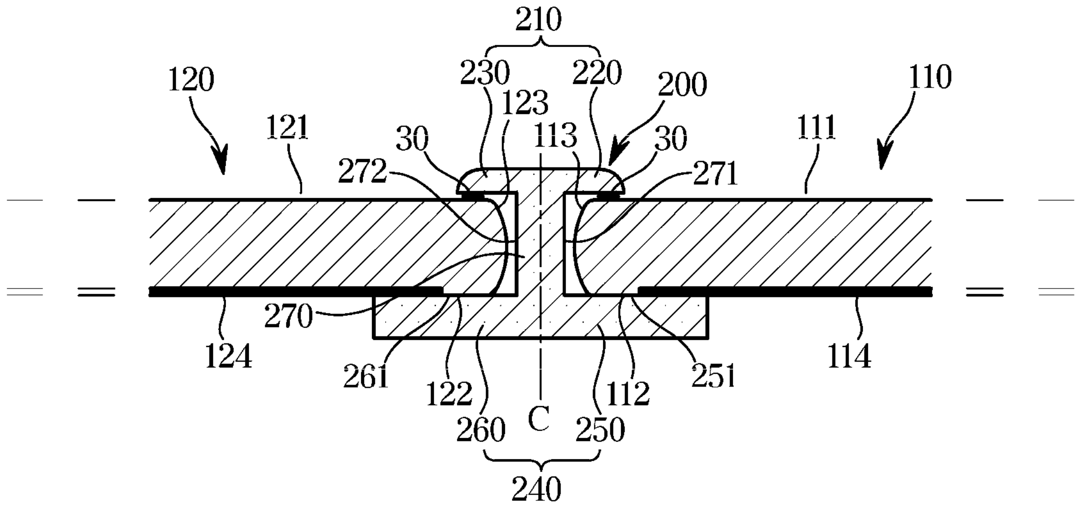
FIG. 16 illustrates cross-sections of glasses and a coupling member in a cooking apparatus according to another embodiment of the disclosure.

FIG. 16 illustrates cross-sections of glasses and a coupling member in a cooking apparatus according to another embodiment of the disclosure.

The coupling member 200 may include a column 270 having both side surfaces 271 and 272.

Referring to FIG. 16, between the coupling member 200 and the glass 100, an adhesive member is not provided, but a sealing member 30 may be provided. The sealing member 30 may seal a gap to block foreign substances from entering the gap between a lower surface of the upper flange 210 and the upper surface of the glass 100. The sealing member 30 may be provided in various forms, but according to an embodiment, the sealing member 30 may include an O-ring.

The sealing member 30 not only blocks the entry of foreign substances by sealing the gap between the upper flange 210 and the glass 100, but also may allow the glass 100 to be coupled to the coupling member 200 without a separate adhesive member by sealing the gap.

As is apparent from the above, according to an embodiment of the disclosure, a cooking apparatus including a plurality of glasses physically separated can be provided.

An embodiment of the disclosure, a cooking apparatus including a plurality of glasses having different colors can be provided.

An embodiment of the disclosure, a cooking apparatus in which a cooking portion and a control portion are provided on different glasses can be provided.

An embodiment of the disclosure, a cooking apparatus capable of preventing foreign substances from entering a gap between a glass and a coupling member coupling a plurality of glasses can be provided.

While the disclosure has been particularly described with reference to exemplary embodiments, it should be understood by those of skilled in the art that various changes in form and details may be made without departing from the spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking apparatus comprising:

a first glass forming a heating region configured to heat a cooking container and having a first edge and a second edge shorter than the first edge;

a second glass forming a control region configured to control the heating region and having a third edge having same length of the first edge, and fourth edge shorter than the second edge; and a coupling member configured to couple the first glass to the second glass, and extending along the first edge of the first glass and the third edge of the second glass, wherein the coupling member comprises a lower flange configured to support a portion of a lower surface of the first edge of the first glass and a portion of a lower surface of the third edge of the second glass, wherein the lower flange comprises a lower groove formed by recessing an upper surface of the lower flange downward, the upper surface of the lower flange supporting the lower surface of the first edge of the first glass, and wherein an adhesive member disposed in the lower groove and disposed between a portion of the upper surface of the lower flange adjacent to the lower groove and the lower surface of the first edge of the first glass, and disposed to cover a side surface of the first edge of the first glass.

2. The cooking apparatus according to claim 1, wherein the coupling member further comprises an insertion groove formed by an upper flange, the lower flange, and a column, and into which the first glass or the second glass is configured to be inserted.

3. The cooking apparatus according to claim 2, further comprising a scaling member configured to block foreign substances from entering a gap between a lower surface of the upper flange and the upper surface of the first glass or the upper surface of the second glass.

4. The cooking apparatus according to claim 2, further comprising an adhesive member disposed in the insertion groove to adhere the first glass or the second glass to the coupling member.

5. The cooking apparatus according to claim 4, wherein:

the upper flange comprises an upper groove into which the adhesive member is configured to be inserted, the upper groove configured to increase a contact area between the adhesive member and the first glass or the second glass, and the upper groove is formed by recessing a lower surface of the upper flange upward.

6. The cooking apparatus according to claim 5, wherein:

the upper groove comprises opposite side surfaces and an upper surface, and one of the opposite side surfaces of the upper groove extends upward from a side surface of the column.

7. The cooking apparatus according to claim 5, wherein the upper groove is formed such that one side surface of the upper groove is open.

8. The cooking apparatus according to claim 1, wherein:

the lower groove comprises opposite side surfaces and a lower surface, and one of the opposite side surfaces of the lower groove extends downward from a side surface of a column.

9. The cooking apparatus according to claim 1, wherein the lower groove is formed such that one side surface of the lower groove is open.

10. The cooking apparatus according to claim 1, wherein the coupling member further comprises:

an upper flange configured to cover a portion of an upper surface of the first glass and a portion of an upper surface of the second glass; and a column configured to connect the upper flange to the lower flange; and wherein a length of the lower flange is longer than a length of the upper flange to increase a contact area of the adhesive member and the lower flange.

11. The cooking apparatus according to claim 10, wherein the upper flange comprises:

a first upper flange extended from a center line of the column toward the first glass; and a second upper flange extended from the center line of the column toward the second glass, and wherein a length in which the first upper flange is extended from the center line toward the first glass is shorter than a length in which the second upper flange is extended from the center line toward the second glass.

12. The cooking apparatus according to claim 1, wherein:

the first glass has a first color, and the second glass has a second color different from the first color.

13. The cooking apparatus according to claim 1, wherein:

the control region is configured to receive a control instruction from a user.

14. A cooking apparatus comprising:

a first glass having a first color and forming a first region on which a cooking container is placed and having a first edge and a second edge shorter than the first edge;

a second glass having a second color different from the first color and forming a second region configured to receive a control instruction of a user and having a third edge having same length of the first edge, and fourth edge shorter than the second edge;

a coupling member configured to couple the first glass to the second glass, and extending along the first edge of the first glass and the third edge of the second glass;

an adhesive member disposed between the first glass and the second glass and the coupling member;

a first painted surface configured to cover the first glass such that the first glass has the first color, in which the first painted surface has the first color; and a second painted surface configured to cover the second glass such that the second glass has the second color, in which the second painted surface has the second color, wherein the coupling member comprises a lower flange configured to support a portion of a lower surface of the first edge of the first glass and a portion of a lower surface of the third edge of the second glass, wherein the lower flange comprises a lower groove formed by recessing an upper surface of the lower flange downward, the upper surface of the lower flange supporting the lower surface of the first edge of the first glass, and wherein the adhesive member disposed in the lower groove and disposed between a portion of the upper surface of the lower flange adjacent to the lower groove and the lower surface of the first edge of the first glass, and disposed to cover a side surface of the first edge of the first glass.

15. The cooking apparatus according to claim 14, wherein the coupling member comprising an upper flange having a first length and a lower flange comprising a second length, wherein the second length is longer than the first length to increase a contact area of the adhesive member and the lower flange, wherein the upper flange is configured to cover a portion of an upper surface of the first glass and a portion of an upper surface of the second glass, wherein the lower flange is configured to support a portion of a lower surface of the first glass and a portion of a lower surface of the second glass, and wherein a column is configured to connect the upper flange to the lower flange.

16. The cooking apparatus according to claim 15, wherein the upper flange comprises an upper groove formed by recessing a lower surface of the upper flange upward.

17. The cooking apparatus according to claim 15, wherein:

the upper flange comprises a first upper flange extended from a center line of the column toward the first glass and a second upper flange extended from the center line of the column toward the second glass, and a length in which the first upper flange is extended from the center line toward the first glass is shorter than a length in which the second upper flange is extended from the center line toward the second glass.

* * * * *